(12) United States Patent
Yu

(10) Patent No.: US 10,127,617 B2
(45) Date of Patent: Nov. 13, 2018

(54) SYSTEM FOR ANALYZING SOCIAL MEDIA DATA AND METHOD OF ANALYZING SOCIAL MEDIA DATA USING THE SAME

(71) Applicant: LG CNS CO., LTD., Seoul (KR)

(72) Inventor: Byung Il Yu, Seoul (KR)

(73) Assignee: LG CNS CO., LTD., Seoul (KR)

( * ) Notice: Subject to any disclaimer, the term of this patent is extended or adjusted under 35 U.S.C. 154(b) by 910 days.

(21) Appl. No.: 14/593,379

(22) Filed: Jan. 9, 2015

(65) Prior Publication Data

US 2016/0203224 A1 Jul. 14, 2016

(51) Int. Cl.
*G06F 17/30* (2006.01)
*G06Q 50/00* (2012.01)

(52) U.S. Cl.
CPC ....... *G06Q 50/01* (2013.01); *G06F 17/30887* (2013.01); *G06F 17/30893* (2013.01)

(58) Field of Classification Search
CPC .............. G06Q 50/01; G06F 17/30887; G06F 17/30893
See application file for complete search history.

(56) References Cited

U.S. PATENT DOCUMENTS

2010/0306249 A1* 12/2010 Hill ................... G06F 17/30867
707/769
2011/0282943 A1* 11/2011 Anderson .............. G06Q 10/06
709/204
2013/0262575 A1* 10/2013 Xiong .................. H04N 21/254
709/204
2014/0282659 A1* 9/2014 Arling .............. H04N 21/44222
725/14
2014/0358630 A1* 12/2014 Bhagat ............... G06Q 30/0201
705/7.29
2015/0007331 A1* 1/2015 Pfeifer, Jr. .......... H04L 63/1433
726/25
2015/0237409 A1* 8/2015 Harper ............... H04N 21/6543
725/19

FOREIGN PATENT DOCUMENTS

KR 10-1400499 B1 6/2014

* cited by examiner

*Primary Examiner* — Huawen A Peng
(74) *Attorney, Agent, or Firm* — KED & Associates, LLP

(57) ABSTRACT

A system and method for analyzing social media data may include a seeding means configured to extract a URL of social media and perform targeting by assigning the extracted URL to a pattern, a crawling means configured to collect data included in the targeted social media, an indexing means configured to classify the collected data as first data or second data based on a predetermined reference value and including (i) a first indexing module configured to assign a first index to the first data and search for first target data based on the first index, and (ii) a second indexing module configured to assign a second index to the second data and search for second target data based on the second index. An analysis means may analyze the first and the second target data and derive a result value, and a visualization means may display the result value.

18 Claims, 4 Drawing Sheets

SYSTEM FOR ANALYZING SOCIAL MEDIA DATA AND METHOD OF ANALYZING SOCIAL MEDIA DATA USING THE SAME

BACKGROUND

1. Field

The present disclosure relates to a system for analyzing social media data, and a method of analyzing social media data using the same.

2. Background

Systems and methods for analyzing social media data are known. However, they suffer from various disadvantages.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
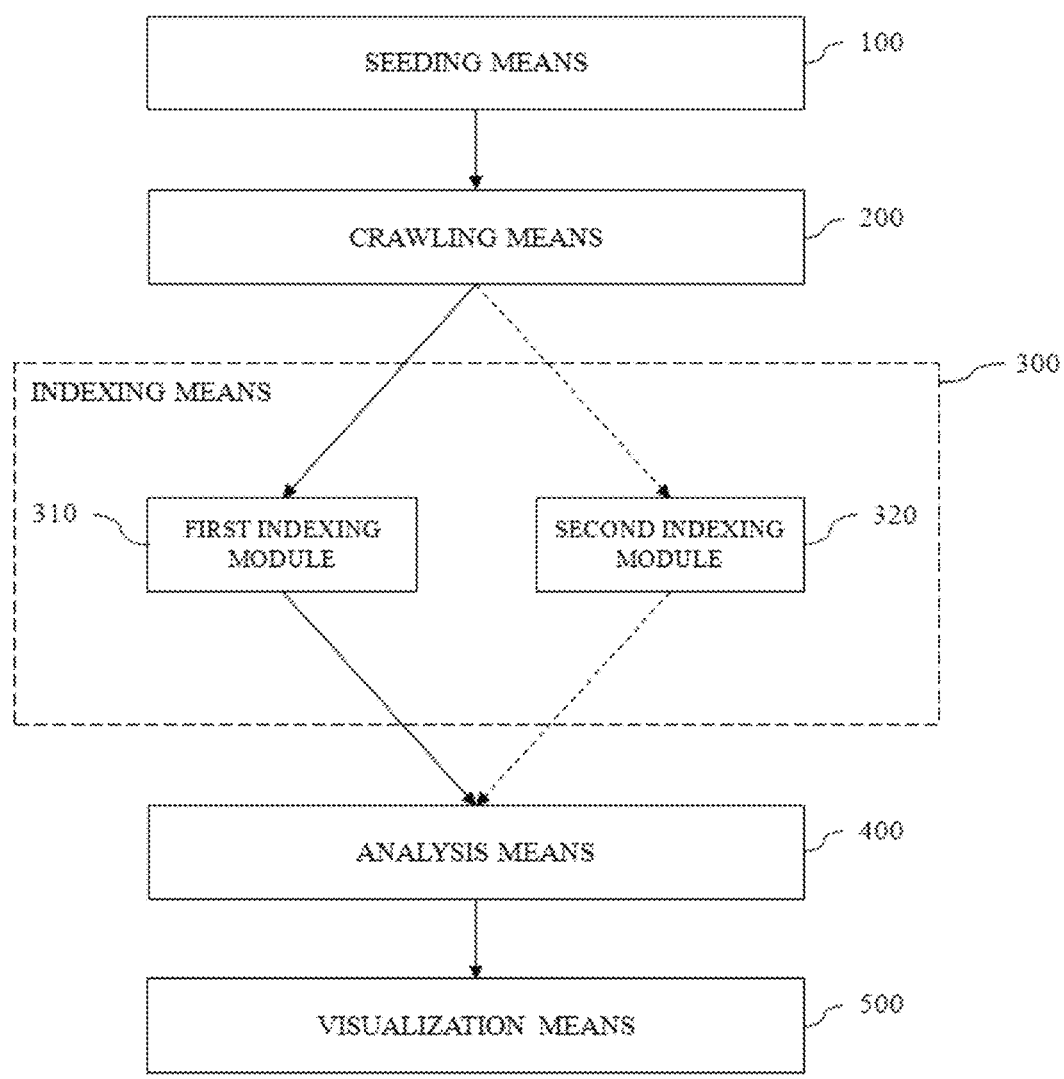
FIG. 1 is a diagram illustrating a structure of a system for analyzing social media data according to an exemplary embodiment of the present disclosure.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. In the accompanying drawings, description which is not related to the present invention will be omitted in order to clearly describe the present invention, and throughout the specification, similar reference numerals are used in similar portions.

Throughout the specification, it will be understood that when an element is referred to as being "connected" or "coupled" to another element, it can be directly connected or coupled to the other element or intervening elements may be present. Further, it will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, exemplary embodiments of the present disclosure will be described in detail with reference to the accompanying drawings.

Big data is an existing database management tool, and refers to sets of large amounts of structured or unstructured data beyond capabilities of collecting, storing, managing, and analyzing data, and technology of extracting value from the data and analyzing a result.

Development of big data technology having generation, collection, analysis, and expression with respect to various kinds of large amounts of data as a feature allow diversified modern society to operate more effectively by predicting it more precisely, and allow each member of personalized modern society to provide, manage and analyze customized information.

In this way, big data has the potential to provide valuable information to society and humanity throughout fields such as politics, society, economy, culture, science and technology, etc., which highlights the importance of big data.

In order to analyze big data, data mining, mechanical learning, natural language processing, pattern recognition, etc. which are used in existing statistics and computer science may be used. Specifically, recently, due to the increase of unstructured data such as a social media, text mining, opinion mining, social network analysis, cluster analysis, etc. are attracting attention as analysis methods.

Meanwhile, before directly analyzing big data, a collection or index/search means for providing an input value with respect to the analysis method described above is needed. Hadoop, which is a representative example of the index/search means, is an open source distributed processing framework constructed by clustering a plurality of servers, and provides a Hadoop distributed file system (HDFS) which is a stable sharing storage place and a MapReduce framework, which is an analysis system. However, since Hadoop needs overhead costs for constructing a hardware infrastructure, it is not economical.

One example of technology may include implementing a parallel processing apparatus and method of a large amount of linked data by repeatedly applying the MapReduce framework and effectively performing transitivity reasoning with respect to a resource description framework (RDF) ontology. However, the technology has a limit in that it is not suitable for indexing/searching of real-time data of a relatively small amount.

The present disclosure is directed to a system for analyzing social media capable of effectively distributing a processing load of data to be accumulated exponentially as time passes, and maximizing accessibility, compatibility, and processing efficiency with respect to real-time, short-time, and long-term collected data, and a method of analyzing the social media data using the same.

System for Analyzing Social Media Data

FIG. 1 is a diagram illustrating a structure of a system for analyzing social media data according to an exemplary embodiment of the present disclosure. Referring to FIG. 1, a system for analyzing social media data may comprise a seeding means 100 configured to extract a URL of social media, and perform targeting by assigning the extracted URL to a pattern; a crawling means 200 configured to collect data included in the targeted social media; an indexing means 300 configured to classify the data into first data and second data according to a predetermined reference, and including (i) a first indexing module 310 configured to assign a first index to the first data and search for first target data based on the first index, and (ii) a second indexing module 320 configured to assign a second index to the second data, and search for second target data based on the second index; an analysis means 400 configured to analyze the first and the second target data and derive a result value; and a visualization means 500 configured to visualize the result value.

The seeding means 100 may be at least one server storing extracted pattern information, and transfer the extracted pattern information to the crawling server by extracting a seed URL, classifying a kind of seed media, extracting an article pattern, extracting a title pattern, and extracting a body pattern.

The crawling means 200 may access an open website, and also a closed website through an identifier/password (ID/PW) method, and collect data included in the web. The crawling means 200 may be at least one server collecting data included in the social media based on one selected among pattern information, keyword information of the seed URL received from the seeding means 100, and a combination thereof. Specifically, the crawling means 200 may be driven based on Nutch which is an open source of Apache or an open application program interface (API) when collecting data using the pattern information of the seed URL and when collecting data using the keyword information, respectively.

The Nutch-based crawling means may generally be driven according to a process such as Inject, Generate, Fetch, Update, Invertlinks, or another appropriate type of process. Inject may convert a seed URL list into a pair of <key:url, value:CrawlDatum>, and store the converted seed URL list, and fetchtime, score, etc. may be input to crawldb and CrawlDatum. Generate may construct a segment in which the collected data is stored in a generated crawldb, arrange data based on CrawlDatum.score, preferentially bring data having high scores, and send a pair of <key:sortValue, value:entry> to Fetch. Fetch may store data in the constructed segment, and Update may collect links of content brought from Fetch and update the crawldb. Invertlinks may generate linkdb, and make <key: to, value: from> from <key: from, values:to>.

Figure 2:
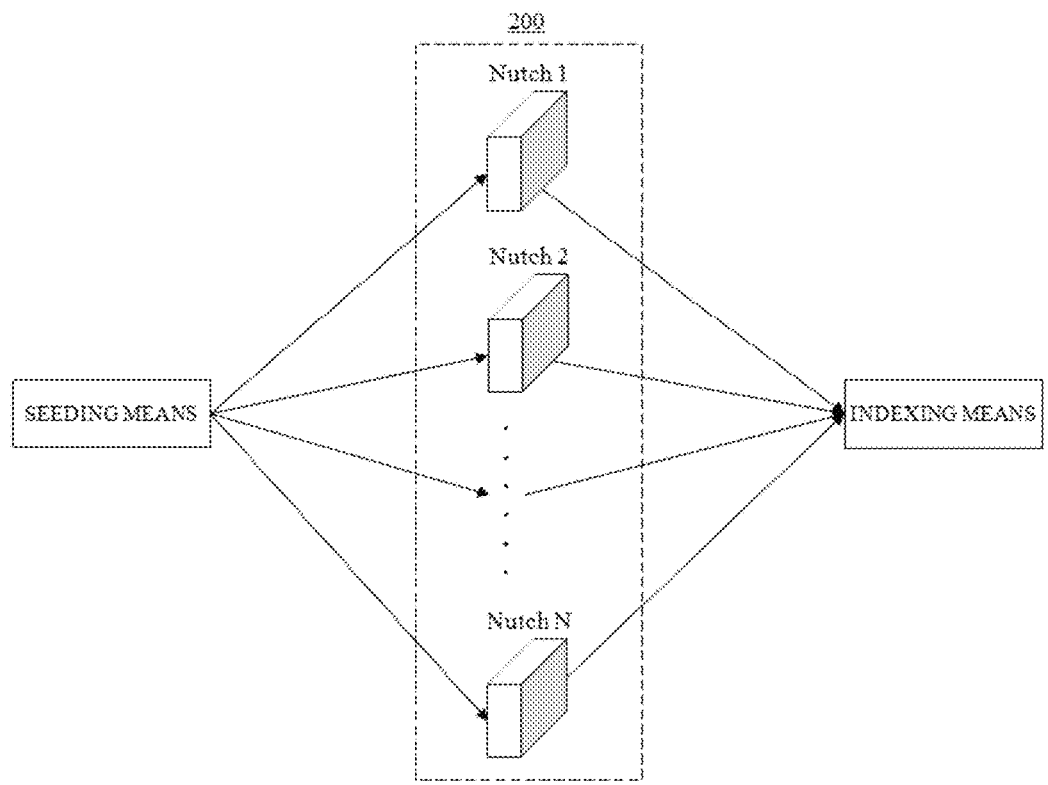
FIG. 2 is a diagram for describing a driving method of a crawling means according to an exemplary embodiment of the present disclosure.

FIG. 2 is a diagram for describing a driving method of a crawling means driven based on Nutch according to an exemplary embodiment of the present disclosure. Referring to FIG. 2, pattern information of the seed URL may be transferred to N, for example 4, Nutch-based crawling servers which are arranged in parallel from the seeding means 100, and the crawling server may perform Nutch-type data collection in 6 runtimes in intervals of five minutes based on the pattern information of the transferred seed URL.

The open application program interface (API) based crawling means may be a Java application, and perform a crawling operation based on the keyword information using an open API provided in a social network service (SNS). For example, the open API-based crawling means may be driven in a manner of loading a predetermined keyword, connecting to a portal site or the SNS, generating an extract material type object of a Json (JavaScript Object Notation) format, transferring a query by inputting a keyword to the open API, and parsing a query result.

Further, the open API-based crawling means may directly access the seed URL, acquire a hyper text mark-up language (HTML) code of a webpage including social media, and extract text of a specific area using a rich site summary (RSS) or a web scrapper-based crawling means with respect to a website having a specific structure such as a site without the open API, a site in which an automatic login needs, a bulletin board of a Java script type. The web scrapper may be applied when the automatic login is needed for data collection, when the webpage has a structure of the bulletin board and the link is a Java script, and when a URL of a webpage of the structure of the bulletin board is a post method, etc. However, the web scrapper may not be applied when a parameter value of the post method is encoded.

The crawling means 200 may be driven based on each of the Nutch, the open API, the RSS, and the web scrapper, and may be driven based on a combination of two or more among them according to necessity.

The indexing means 300 may be at least one server classifying the data into first data and second data by a predetermined reference, assign an index to each of the first and the second data through a plurality of, for example, two indexing modules, and search target data based on the index. The term "index" used herein, may be understood to include data attributes, recording places, and metadata associated with corresponding data.

The predetermined reference may be a capacity of data, and at this time, the capacity of the first data may be equal to or less than 200 terabytes, and the capacity of the second data may be more than 200 terabytes.

Further, the predetermined reference may be a collection period of the data, and at this time, the collection period of the first data may be real time or within one year from the present, and the collection period of the second data may be more than one year from the present.

Figure 3:
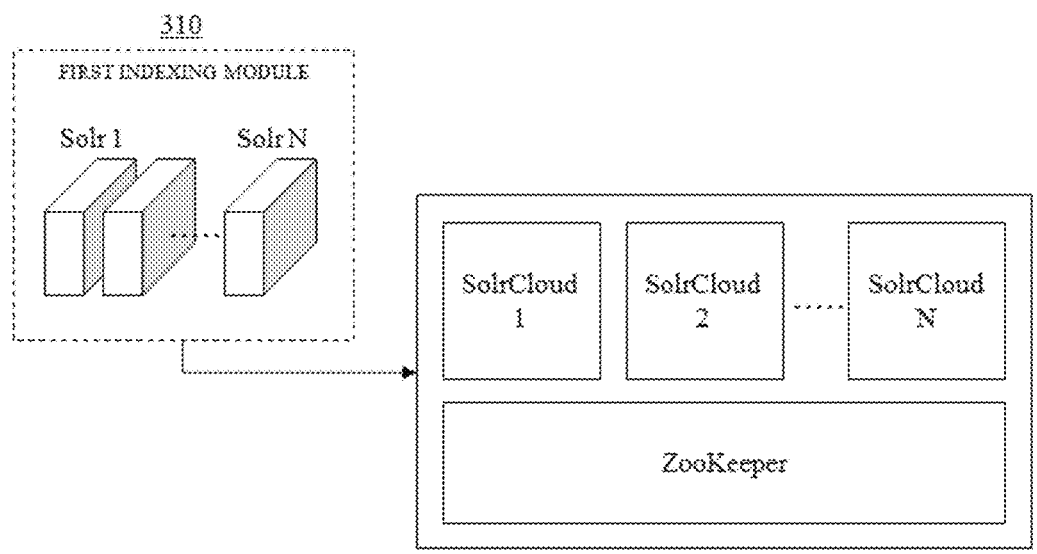
FIG. 3 is a diagram illustrating a structure of a first indexing module according to an exemplary embodiment of the present disclosure.

FIG. 3 is a diagram illustrating a structure of a first indexing module according to an exemplary embodiment of the present disclosure. The first indexing module may include two or more unit servers in which a morpheme or a keyword-analysis-based indexing unit is installed. Referring to FIG. 3, for example, the first indexing module 310 may include two or more unit servers and a monitoring server in which a Lucene/Solr-based indexing unit is installed.

The Lucene/Solr-based indexing unit may have excellent compatibility with Hadoop which will be described hereinafter, and specifically, Lucene written in Java may process the index by being integrated with Hadoop to construct one tool for distributed text management, and Hadoop may distribute the query into a cluster. Solr may have a function of analyzing a standard file format such as extensible mark-up language (XML) and provide an integrated solution for dynamic clustering.

That is, the indexing unit may be based on Lucene/Solr, and since a cluster is formed by arranging a plurality of unit servers in which the indexing unit is installed in parallel, a distributed processing environment in which a data stream is divided into a plurality of data streams may be created on a hardware side as well as a software side.

In an embodiment, the Lucene/Solr-based indexing unit may be a Solr cloud. For example, the Solr cloud may have two shards and four nodes, and be driven by a server of 8 cores/16 GB RAM, but the resources and the driving environment are not limited thereto.

Figure 4:
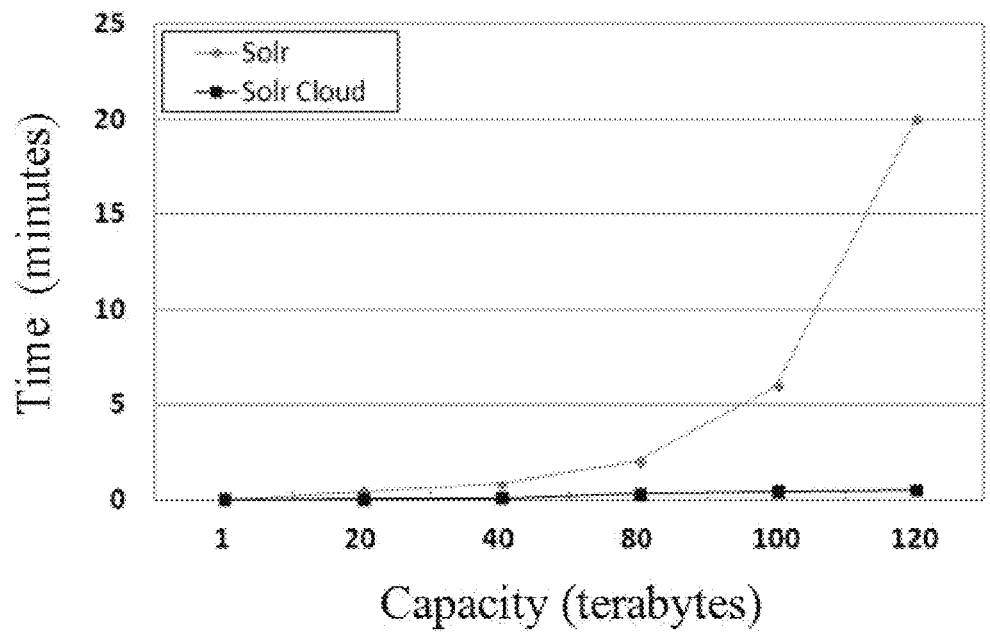
FIG. 4 is a graph illustrating a data index and search performance measurement result of a first indexing module according to an exemplary embodiment of the present disclosure.

FIG. 4 is a graph illustrating a data index and search performance measurement result of a first indexing module according to an exemplary embodiment of the present disclosure. When the first indexing module including two or more unit servers according to an embodiment of the present disclosure is used, an index speed and a search speed may be increased to about 50%, 15%, respectively, by comparison with the first indexing module configured as a single server. Moreover, a down time of a system may be minimized by supporting failover.

Meanwhile, the monitoring server which may be referred to as a zookeeper may monitor operation status of the plurality of unit servers, and may notify another unit server when the operation status of at least one among the plurality of unit servers is changed. For example, the monitoring server may generate the unit server by reflecting change of the operation status, or may monitor the operation status when it is not possible to connect a terminal because operation of any one among the plurality of unit servers is stopped, when the unit server in which the operation is stopped is operated again (that is, when the unit server is changed to an accessible status), or when a new unit server is added, etc.

Figure 5:
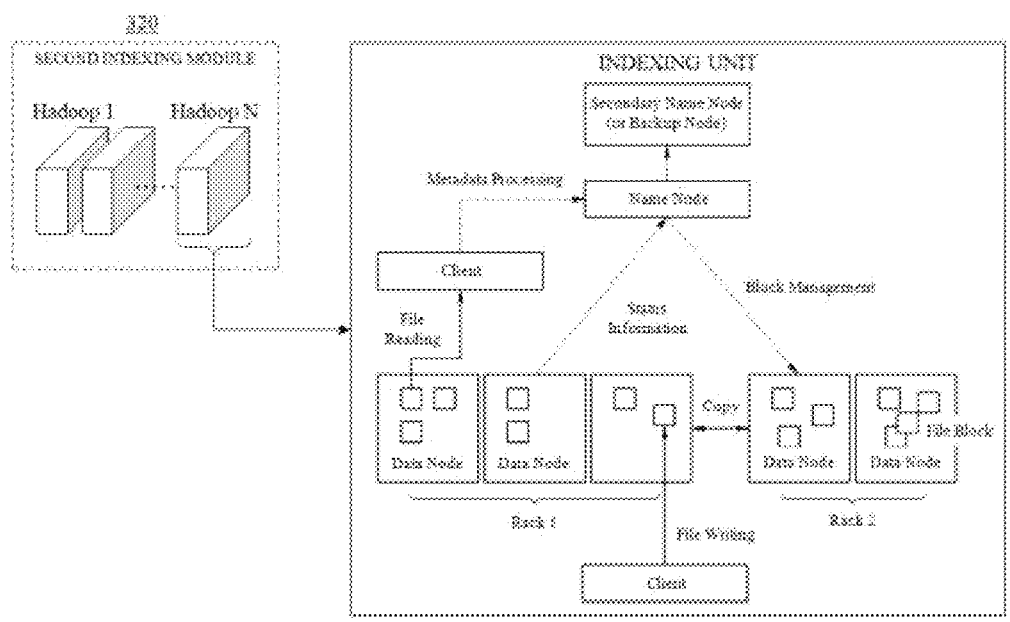
FIG. 5 is a diagram illustrating a structure of a second indexing module according to an exemplary embodiment of the present disclosure.

Referring to FIG. 5, the second indexing module 320 according to an embodiment of the present disclosure may include two or more unit servers in which a distributed processing environment-based indexing unit, for example, a Hadoop distributed processing environment-based indexing unit is installed. Since the indexing unit is based on Hadoop, the distributed processing environment may be created on the software side, and also since the cluster is formed by arranging the plurality of unit servers in which the indexing unit is installed in parallel, the distributed processing environment in which the data stream is divided into a plurality of data streams may be created in the hardware side.

Specifically, the Hadoop distributed processing environment may be operated by installing in a file system operating in only one server, and also in the plurality of servers. The Hadoop distributed processing environment may include a primary name node server, a secondary name node server, and a plurality of data node servers.

The name node server may manage a file system space such as a directory, a file name, a file block, etc., and process a file access request of a client, and the file data may be divided in units of block and stored in the plurality of data node servers dispersively. Since the blocks are copied and stored in another data node server in order to preserve availability, when a failure occurs in the specific data node server, the name node server may automatically detect the failure, additionally generate a copy using a copy stored in the data node server in which the failure does not occur, and thus preserve the availability.

Figure 6:
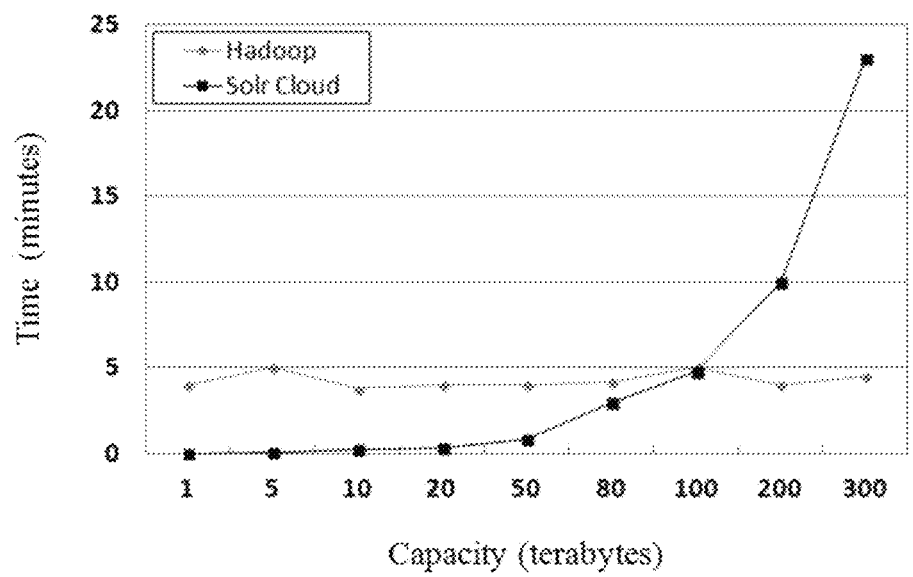
FIG. 6 is a graph illustrating data index and search performance measurement results of a first indexing module and a second indexing module according to an exemplary embodiment of the present disclosure.

FIG. 6 is a graph illustrating data index and search performance measurement results of a first indexing module and a second indexing module according to an exemplary embodiment of the present disclosure. The second indexing module may have four nodes, and be driven using a server of six cores/24 GB RAM, but the resources and the driving environment are not limited thereto. The resources and the driving environment of the first indexing module were described above. Referring to FIG. 6, when comparing the index and search performance of the Solr cloud-based first indexing unit and the Hadoop distributed processing environment-based second indexing unit according to a data capacity, the second indexing module maintains a processing time of about four minutes regardless of change of the data capacity, but the processing time of the first indexing unit increases as the data capacity increases.

Specifically, the processing times of the first indexing module and the second indexing module intersect at an intersection point at which the data capacity is about 100 terabytes, the processing time of the first indexing module is faster in a period which is equal to or less than the intersection point, and the processing time of the second indexing module is faster in a period which is more than the intersection point. Since a small amount of the real-time or short-term data may be processed by the first indexing module and a relatively large amount of long-term data may be processed by the second indexing module, an effective analysis system may be constructed regardless of the data capacity. Accordingly, the data capacity which can be processed in the indexing means 300 may be classified as a small amount of data or a large amount of data based on a predetermined value, and the small amount of data and the large amount of data may be processed by the first indexing module and the second indexing module, respectively. Referring to FIG. 6, the predetermined value may be 200 terabytes.

The analysis means 400 may be at least one server performing one selected from a cluster including content categorizing, data mining, text mining, and a combination of two or more thereof. The analysis means 400 may be a server in which an analysis solution which is well known to be obtainable is installed.

As an example of analysis platform performing a content categorizing function, "SAS® Content Categorization," may increase an information configuration, an access speed and efficiency by omitting excessive tagging work of processing a large amount of data and requiring manual labor, and effectively manage multilingual data by recognizing and analyzing parts of speech of more than 30 languages utilizing a high level language and natural language processing method.

As an example of analysis platform performing a data mining function, "SAS® Enterprise Miner" may have simple preparation work for integrating and analyzing data access, management, and filtering work, increase efficiency of modeling by improving a quality of data, and improve reliability with respect to a result value. Further, "SAS® Enterprise Miner" may shorten an execution time, effectively use hardware resources, and provide a high level estimation/technology modeling algorithm such as market cart analysis, an opinion decision tree, gradient boosting, a neural network, linear and logistic regression supporting a multithread algorithm, multi-processing and grid computing.

As an example of analysis platform performing a text mining function, "SAS® Text Analytics" may provide a text mining solution integrating text-based information and structural data and various tools for searching for and extracting knowledge in a text document other than an estimation analysis providing exact answers with respect to complex queries, automatically and quickly classify a large amount of multilingual data by combining high level modeling, natural language processing, and high level language technology, and find trends, patterns, and emotions which are hidden in original text content.

Meanwhile, the visualization means 500 may be a web-based or other-technology-based dashboard in which the real-time data is collected, processed, or displayed from various data sources, or at least one server in which the same is installed.

The term "dashboard" used herein, may be understood to include a digital dashboard, an enterprise dashboard, a business dashboard, an executive dashboard, an operational dashboard, a business intelligence (BI) dashboard, a database dashboard, a web dashboard, etc. The dashboard may be designed so that a user can visually confirm past and present events at a glance.

The dashboard may be designed based on various platforms such as SaaS, HTML, Hichart, Tomcat, etc. Specifically, the SaaS platform may enable a plurality of users to share one application, manage and customize working characteristics of each tenant by a metadata set, and manage common codes and rights of each tenant. Accordingly, the SaaS platform may apply to a multi-tenancy environment capable of visualizing and providing an analysis result value to the plurality of users as a single system.

Social Media Data Analysis Method

In order to achieve the above objects, another aspect of the present disclosure may provide a method of analyzing social media data using the system of analyzing the social media data.

Figure 7:
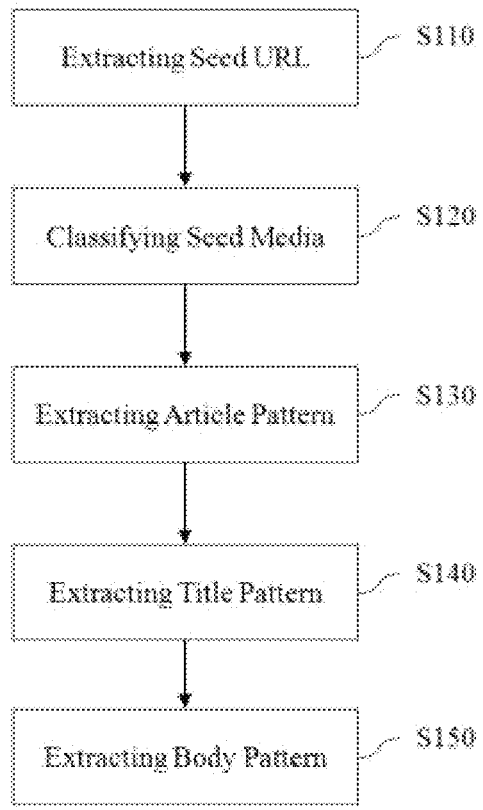
FIG. 7 is a diagram for describing a seeding method according to an exemplary embodiment of the present disclosure.

FIG. 7 is a diagram for describing a seeding method according to an exemplary embodiment of the present disclosure. The seeding operation may include extracting a seed URL (S110), classifying a kind of the seed media (S120), extracting an article pattern (S130), extracting a title pattern (S140), and extracting a body pattern (S150). The seeding method may further include storing the extracted pattern information in a seeding server, and transmitting the extracted pattern information to a crawling server.

First, the extracting of the seed URL (S110) may include discovering a seed domain that a client wants to analyze. For example, the extracting of the seed URL (S110) may include specifying "http://joongang.joins.com/", which is a website that provides news, as the seed domain, and using the date of each article to confirm whether an article was input on the present day (or on a prescribed date(s)). After this, the extracting of the seed URL (S110) may include extracting each webpage in which there is an article from the present day as the seed URL, and setting the number of pages so as not to exceed 5 to 10 pages.

The classifying of the kind of seed media (S120) may include defining the kind of seed media as news or a media by referring to "Jungang Ilbo," which is a media name, and "News," "Economy," etc. which are categories, which are displayed at the top of the webpage. That is, since the kind of seed media may not be determined based on a structure of the site but may be determined by qualitatively analyzing service content of the site, a site having a blog structure but providing news may be defined as the news or press.

The extracting of the article pattern (S130) may include extracting a link URL connected as a real article in an article list page, and searching for and assigning a common pattern. For example, link URLs listed in the list page may be displayed as "http://article.joinsmsn.com/news/article/article.asp?total_id=10963896&ctg=1103", "http://article.joinsmsn.com/news/article/article.asp?total_id=10963895&ctg=1105", etc., and the common pattern may be assigned by changing an end portion of the link URL as in "http://article\.joinsmsn\.com/news/article/article\.asp\?total_id=[0-9]+&ctg=[0-9]+".

The extracting of the title pattern (S140) and the extracting of the body pattern (S150) may include extracting a pattern of a title and a body confirmed by clicking the link URL. The extracting of the title pattern (S140) and the extracting of the body pattern (S150) may include discovering patterns of an HTML source of title and body areas, and classifying each pattern according to 3 to 5 factors by "::". For example, the patterns of the title and body may be set as div::class::title::h3 and div::id::article_content. When an image of the body is excluded, the patterns of the title and body may be set as div::id::article_content:: ::ˆimg by using "ˆ", and be set as div::id::article_content::p::ˆimg by adding a predetermined pattern in order to exclude link text regardless of the title of the body.

When the seeding method is excluded, the method of analyzing the social media data according to another aspect of the present disclosure may use the system of analyzing the social media data including the seeding means, the crawling means, the indexing means, the analyzing means, and the visualization means which are connected in a subsequent data stream, and the system of analyzing the social media data and each component included in the same are the same as described above.

The present disclosure is directed to a system for analyzing social media capable of effectively distributing a processing load of data to be accumulated exponentially as time passes, and maximizing accessibility, compatibility, and processing efficiency with respect to real-time, short-time, and long-term collected data, and a method of analyzing the social media data using the same.

According to one aspect of the present disclosure, there is provided a system for analyzing social media data, which may include: a seeding means configured to extract a URL of social media, and perform targeting by assigning the extracted URL to a pattern; a crawling means configured to collect data included in the targeted social media; an indexing means configured to classify the data into first data and second data according to a predetermined reference, and including (i) a first indexing module configured to assign a first index to the first data and search for first target data based on the first index, and (ii) a second indexing module configured to assign a second index to the second data, and search for second target data based on the second index; an analysis means configured to analyze the first and the second target data and derive a result value; and a visualization means configured to visualize the result value.

In an embodiment, the crawling means may be driven based on one selected from a group consisting of Nutch, an open application program interface (API), a rich site summary (RSS), a web scrapper, and a combination of two or more thereof.

In an embodiment, the predetermined reference may be a capacity of the data.

In an embodiment, the capacity of the first data may be equal to or less than 200 terabytes. In an embodiment, the capacity of the second data may be more than 200 terabytes.

In an embodiment, the first indexing module may comprise two or more unit servers in which a morpheme- or a keyword-analysis-based indexing unit is installed.

In an embodiment, the predetermined reference may be a collection period of the data. In an embodiment, the collection period of the first data may be real time or within one year from the present. In an embodiment, the collection period of the second data may be more than one year in from the present.

In an embodiment, the second indexing module may comprise two or more unit servers in which a distributed processing environment-based indexing unit is installed.

In an embodiment, the analysis means may perform one selected from a group consisting of a content categorizing, a data mining, a text mining, and a combination of two or more thereof.

According to another aspect of the present disclosure, there is provided a method of analyzing social media data using the system for analyzing the social media data.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A system for analyzing social media data, comprising: at least one server configured to:
   extract a URL of social media and perform targeting of the social media by assigning the extracted URL to a pattern;
   collect data included in the targeted social media;
   classify the collected data into first data and second data based on a predetermined reference value, and including
      a first indexing server configured to assign a first index to the first data and search for first target data based on the first index, and
      a second indexing server configured to assign a second index to the second data and search for second target data based on the second index, the second indexing server being based on a different framework than the first indexing server,
   wherein the predetermined reference value is a capacity of data or a collection period of the data, and
   classifying the collected data into the first data of the first indexing server when the capacity of data or the collection period of data is less than or equal to the predetermined reference value, and
   classifying the collected data into the second data of the second indexing server when the capacity of data or the collection period of data is greater than the predetermined reference valve,
   wherein the first indexing server is optimized for performance for data assigned to the first index where the capacity of data or the collection period of data is less than or equal to the predetermined reference value, and the second indexing server is optimized for performance for data assigned to the second index where the capacity of data or the collection period of data is greater than the predetermined reference value, and
   wherein the at least one server is configured to
   analyze the first and the second target data and derive a result value; and
   generate a display of the result value.

2. The system for analyzing the social media data of claim 1, wherein the at least one server that collects data included in the targeted social media is driven based on at least one of Nutch, an open application program interface (API), a rich site summary (RSS), or a web scrapper.

3. The system for analyzing the social media data of claim 1, wherein the capacity of the first data is less than or equal to 200 terabytes.

4. The system for analyzing the social media data of claim 1, wherein the capacity of the second data is more than 200 terabytes.

5. The system for analyzing the social media data of claim 1, wherein the first indexing server includes two or more unit servers in which a morpheme or a keyword-analysis-based indexing unit is installed.

6. The system for analyzing the social media data of claim 1, wherein the collection period of the first data is in real time or within one year from when data is collected.

7. The system for analyzing the social media data of claim 1, wherein the collection period of the second data is more than one year from when data is collected.

8. The system for analyzing the social media data of claim 1, wherein the second indexing server includes two or more unit servers in which a distributed processing environment based indexing unit is installed.

9. The system for analyzing the social media data of claim 1, wherein analyzing the first and second data includes at least one of content categorizing, data mining, or text mining.

10. The system for analyzing the social media data of claim 1, wherein
    a processing time for analyzing the collected data based on the first indexing module is lower than a processing time for analyzing target data based on the second indexing module at or below the predetermined reference value, and
    a processing time for analyzing target the collected data based on the second indexing module is lower than a processing time for analyzing target data based on the first indexing module above the predetermined reference value.

11. A method of analyzing social media data using a system including a plurality of servers for analyzing social media data comprising:
    extracting, in a seeding module, a URL of social media and performing targeting of the social media by assigning the extracted URL to a pattern;
    collecting, in a crawling module, data included in the targeted social media;
    classifying, in an indexing module, the collected data into first data and second data based on a predetermined reference value, including
       assigning, in a first indexing module, a first index to the first data and search for first target data based on the first index, and
       assigning, in a second indexing module, a second index to the second data and search for second target data based on the second index, the second indexing module being based on a different framework than the first indexing module,
    wherein the predetermined reference value is a capacity of data or a collection period of the data, and
    classifying the collected data into the first data of the first indexing module when the capacity of data or the collection period of data is less than or equal to the predetermined reference value, and
    classifying the collected data into the second data of the second indexing module when the capacity of data or the collection period of data is greater than the predetermined reference valve,
    wherein the first indexing module is optimized for performance for data assigned to the first index where the capacity of data or the collection period of data is less than or equal to the predetermined reference value, and the second indexing module is optimized for performance for data assigned to the second index where the capacity of data or the collection period of data is greater than the predetermined reference value;

analyzing, in an analysis module, the first and the second target data and deriving a result value; and generating, in a visualization module, a display of the result value.

12. The method of analyzing the social media data of claim 11, wherein the crawling module is driven based on at least one of Nutch, an open application program interface (API), a rich site summary (RSS), or a web scrapper.

13. The method of analyzing the social media data of claim 11, wherein the capacity of the first data is less than or equal to 200 terabytes and the capacity of the second data is more than 200 terabytes.

14. The method of analyzing the social media data of claim 11, wherein the first indexing module includes two or more unit servers in which a morpheme or a keyword-analysis-based indexing unit is installed.

15. The method of analyzing the social media data of claim 11, wherein the collection period of the first data is real time or within one year from when data is collected and the collection period of the second data is more than one year from when data is collected.

16. The method of analyzing the social media data of claim 11, wherein the second indexing module includes two or more unit servers in which a distributed processing environment based indexing unit is installed.

17. The method of analyzing the social media data of claim 11, wherein the analysis module performs at least one of content categorizing, data mining, or text mining.

18. The system for analyzing the social media data of claim 11, wherein a processing time for analyzing the collected data based on the first indexing module is lower than a processing time for analyzing target data based on the second indexing module at or below the predetermined reference value, and a processing time for analyzing target the collected data based on the second indexing module is lower than a processing time for analyzing target data based on the first indexing module above the predetermined reference value.

* * * * *